United States Patent [19]

Isobe et al.

[11] Patent Number: 4,855,611
[45] Date of Patent: Aug. 8, 1989

[54] CABLE ADAPTOR WITH SWITCH

[75] Inventors: Akira Isobe; Tsutomu Anzai, both of Tokyo, Japan

[73] Assignee: Sony Corporation, Tokyo, Japan

[21] Appl. No.: 192,607

[22] Filed: May 11, 1988

[30] Foreign Application Priority Data

May 29, 1987 [JP] Japan ................. 62-133922

[51] Int. Cl.$^4$ ................ H01P 1/10; H04N 7/16
[52] U.S. Cl. ................ 307/125; 307/112; 307/129; 200/504; 358/181; 333/105; D13/32
[58] Field of Search ............... 307/112, 125, 149, 239, 307/243, 259, 129; 200/5 R, 5 A, 5 B, 5 C, 5 D, 5 E, 6 A, 11 R, 16 D, 16 C, 18, 51 R, 51.03, 51.04, 51.06, 51.07, 51.09, 51.10, 51.11, 51.12, 51.14, 252, 277, 243, 153 S, 155 R, 61.58 R; 358/181, 183, 182, 188, 185, 189, 107, 86, 87, 22; 333/101, 105, 106, 258, 259, 262; D13/12, 32; 328/104, 159

[56] References Cited

U.S. PATENT DOCUMENTS

| D. 277,847 | 3/1985 | Huang | D13/32 |
|---|---|---|---|
| 2,550,921 | 5/1951 | Greene | 333/105 |
| 2,662,142 | 12/1953 | Nelson | 200/153 S |
| 2,759,152 | 8/1956 | Charles | 333/105 |
| 2,941,164 | 6/1960 | Lanctot | 333/105 |
| 3,010,080 | 11/1961 | Concelman | 333/105 |
| 3,227,969 | 1/1966 | Bentley | 333/105 |
| 3,495,060 | 2/1970 | Biggs | 200/153 S |
| 3,600,542 | 8/1971 | Richter | 200/153 S X |
| 3,648,000 | 3/1972 | Thompson | 200/153 S |
| 3,940,584 | 2/1976 | Cauldwell et al. | 200/153 S |
| 4,013,854 | 3/1977 | Workman | 200/153 S |
| 4,276,562 | 6/1981 | Stewart et al. | 358/181 X |

OTHER PUBLICATIONS

Radio Shack 1986 Catalog (No. 393 pp. 97, 98 and 99).

*Primary Examiner*—Shoop Jr., William M.
*Assistant Examiner*—Paul Ip
*Attorney, Agent, or Firm*—Hill, Van Santen, Steadman & Simpson

[57] ABSTRACT

The invention relates to a change-over switch suitable for use in the cast of connecting, e.g., a camera integrated type VTR to a television receiver. A first input terminal and an output terminal are closely arranged. The first input terminal, the output terminal, and switching means are connected by a parallel line consisting of first and second signal lines. The first input terminal and the output terminal are connected by the first switching operation. The second input terminal and the output terminal are connected by the second switching operation. Thus, the camera integrated type VTR, TV antenna, and TV receiver can be attached without complicatedly connecting the cables and without extending the cable from the antenna.

1 Claim, 6 Drawing Sheets

CABLE ADAPTOR WITH SWITCH

BACKGROUND OF THE INVENTION

1. Field of the Invention

The present invention relates to a change-over switch which is suitable for use in the case where, for example, a camera integrated type VTR is connected to a television receiver.

2. Description of the Prior Art

As shown in FIG. 1, hitherto, when a camera integrated type VTR 52 is connected to a television receiver 51 having no video input terminal (an input terminal of a base band signal which is not modulated to a high frequency signal (RF signal)), a cable adapter 54 with a switch to change over a reception signal from a television antenna 53 and an RF output signal from the VTR 52 is used.

Namely, as shown in FIGS. 2 and 3, the cable adapter 54 has input terminals 56A and 56B, an output terminal 57, and a switch 58. For example, F-type connectors are used as the input terminals 56A and 56B and output terminal 57. For instance, a slide switch is used as the switch 58. The input terminals 56A and 56B, output terminal 57, and switch 58 are integrally arranged in a housing 60. As shown in FIG. 3, a terminal 58A of the switch 58 arranged in the housing 60 is connected with the input terminal 56A. A terminal 58B of the switch 58 is connected to the input terminal 56B. A terminal 58C of the switch 58 is connected to the output terminal 57. When the switch 58 is switched so that the terminals 58A and 58C are connected, a signal from the input terminal 56A is taken out from the output terminal 57. When the switch 58 is switched so that the terminals 58B and 58C are connected, a signal from the input terminal 56B is taken out from the output terminal 57.

In FIG. 1, a cable 61 which is led out of the television antenna 53 is connected to the input terminal 56A of the cable adapter 54. One end of a cable 63 is connected to an RF output terminal 65 of the VTR 52. The other end of the cable 63 is connected to the input terminal 56B of the cable adapter 54. One end of a cable 67 is connected to an antenna terminal 69 of the television receiver 51. The other end of the cable 67 is connected to the output terminal 57 of the cable adapter 54.

When a television broadcasting program is displayed by the television receiver 51, the switch 58 of the cable adapter 54 is switched so as to connect the terminals 58A and 58C. When a reproduced image from the VTR 52 is displayed by the television receiver 51, the switch 58 of the cable adapter 54 is switched so as to connect the terminals 58B and 58C.

With such a cable adapter 54 having a switch, the reproduced image from the VTR 52 can be easily displayed by the television receiver 51 having no video input terminal. However, when such a cable adapter 54 is used, three cables 61, 63, and 67 are needed to connect the television receiver 51, VTR 52, and television antenna 53. Thus, there is a problem such that the wiring of the three cables 61, 63, and 67 becomes complicated. On the other hand, before the VTR 52 is connected to the television receiver 51 by using the cable adapter 54, the cable 61 from the television antenna 53 is directly connected to the antenna terminal 69 of the television receiver 51. As compared with the length of the cable 61 at this time, the length of the cable 61 when the cable adapter 54 is used becomes longer. Further, in the conventional cable adapter 54, as shown in FIGS. 2 and 3, since the same type of connectors (for instance, plug type connectors in the case of the NTSC system) are used as the input terminals 56A and 56B and output terminal 57, there is a fear such that the cables are erroneously connected. In addition, there is a large influence by the signal interference among the cables.

SUMMARY OF THE INVENTION

It is, therefore, an object of the present invention to provide a cable adapter with switch in which a wiring of cables does not become complicated.

Another object of the invention is to provide a cable adapter with switch by which a cable from a television antenna can be attached without extending.

Still another object of the invention is to provide a cable adapter with switch in which an erroneous connection hardly occurs.

According to the invention, these objects are accomplished by a cable adapter with switch in which this cable adapter has a first input terminal 4, a second input terminal 6, and an output terminal 5, the first input terminal 4 and the output terminal 5 are closely arranged, the first input terminal 4 and one input terminal 7A of switching means 7 are connected by a first signal line 3A, the output terminal 5 and an output terminal 7C of the switching means 7 are connected by a second signal line 3B, the signal lines 3A and 3B constitute a parallel line 3, the second input terminal 6 is connected to the other input terminal 7B of the switching means 7, and the switching means functions so as to connect the input terminal 4 and the output terminal 5 by the first switching operation and functions so as to connect the second input terminal 6 and the output terminal 5 by the second switching operation.

The input terminal 4 and output terminal 5 are arranged in the connector section 1. The input terminal 6 and switch 7 are arranged in the connector section 2. The connector sections 1 and 2 are connected by the cable 3. The output terminal of the connector section 1 is connected to an antenna input terminal of a television receiver 13. A cable from a television antenna is connected to the input terminal 4 of the connector section 1. The input terminal 6 of the connector section 1 is connected to an RF output terminal of a camera integrated type VTR 15. Either one of the reception output of the television broadcasting program which is input through the cable connected to the input terminal 4 of the connector section 1 and the output signal of the camera integrated type VTR 15 which is input from the input terminal 6 of the connector section 2 is selected by the switching operation of the switch 7 in the connector section 2. The selected signal is output from the output terminal 5 of the connector section 1 and supplied to the antenna terminal of the television receiver 13.

The above and other objects and features of the present invention will become apparent from the following detailed description and the appended claims with reference to the accompanying drawings.

DETAILED DESCRIPTION OF THE INVENTION

An embodiment of the present invention will be described in detail hereinbelow with reference to the drawings.

Figure 1:
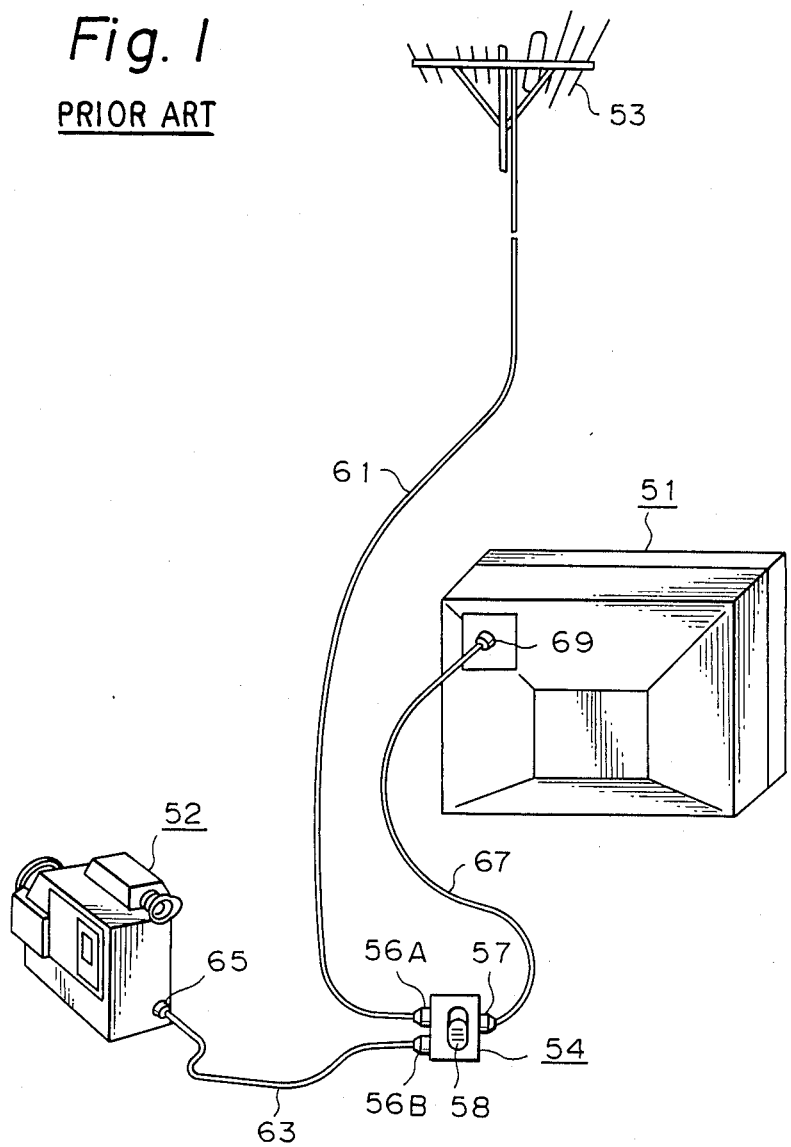
FIG. 1 is a perspective view showing a conventional connection between a VTR and a television receiver.
Figure 2:
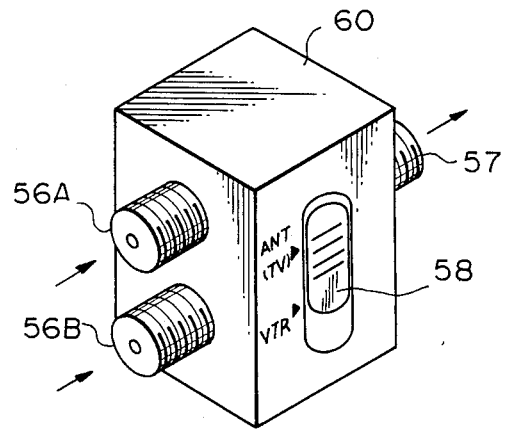
FIGS. 2 and 3 are a perspective view and a connection diagram of a conventional cable adapter with switch.
Figure 3:
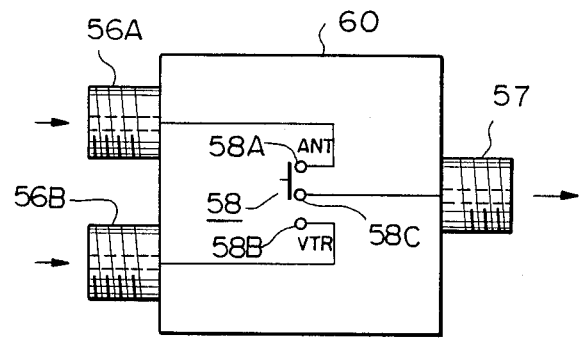
Figure 4:
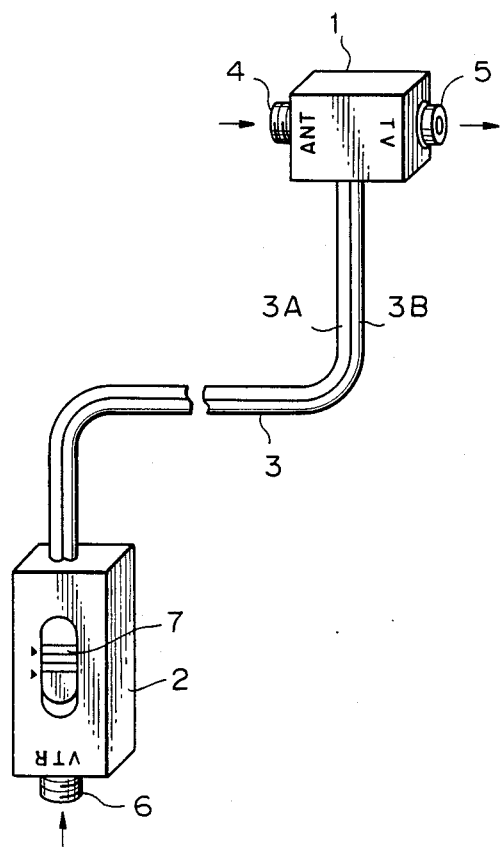
FIG. 4 is a perspective view of an embodiment of the present invention.
Figure 5:
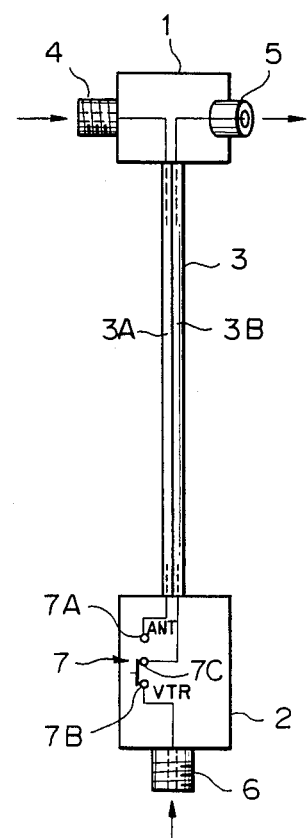
FIG. 5 is a connection diagram of the embodiment of the invention.

FIGS. 4 and 5 show an embodiment of the invention. As shown in these diagrams, this embodiment comprises a connector section 1, a connector section 2, and a cable 3 to connect the connector sections 1 and 2. An input terminal 4 and an output terminal 5 are arranged in the connector section 1. For example, plug type and jack type of the F-type connectors are used as the input terminal 4 and output terminal 5. An input terminal 6 and a switch 7 are provided for the connector section 2. For example, the plug type of the F-type connector is used as the input terminal 6. The cable 3 is a parallel line consisting of two coaxial cables 3A and 3B.

As shown in FIG. 5, the input terminal 4 of the connecting section 1 and a terminal 7A of the switch 7 in the connector section 2 are connected through the cable 3A. The output terminal 5 of the connector section 1 and a terminal 7C of the switch 7 in the connector section 2 are connected through the cable 3B. In the connector section 2, the input terminal 6 is connected to a terminal 7B of the switch 7.

For instance, a slide switch is used as the switch 7. Either the signal which is input to the input terminal 4 of the connector section 1 or the signal which is input to the input terminal 6 of the connector section 2 is selectively output from the output terminal 5 of the connector section 1 by the switching operation of the switch 7. Namely, when the switch 7 is switched so as to connect the terminals 7A and 7C, the signal input to the input terminal 4 of the connector section 1 is output from the output terminal 5 of the connector section 1 through the cable 3A, switch 7, and cable 3B. When the switch 7 is switched so as to connect the terminals 7B and 7C, the signal input to the input terminal 6 of the connector section 2 is output from the output terminal 5 of the connector section 1 through the switch 7 and cable 3B.

Figure 6:
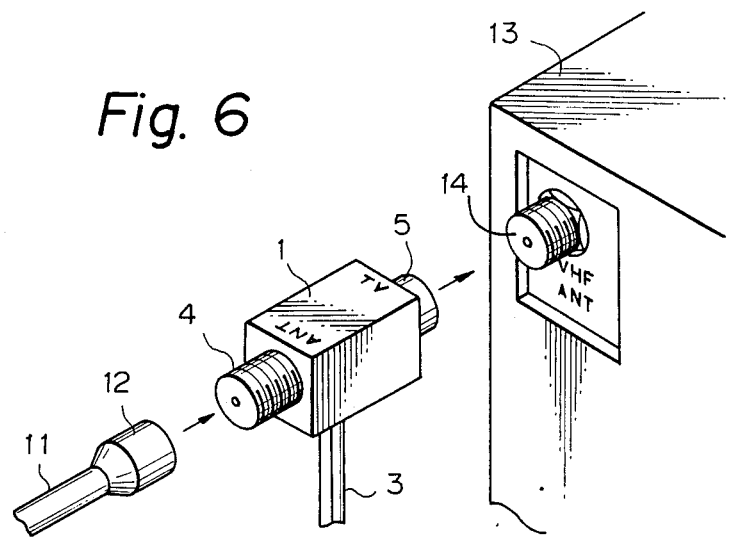
FIGS. 6, 7, and 8 are perspective views for explaining the embodiment of the invention.
Figure 7:
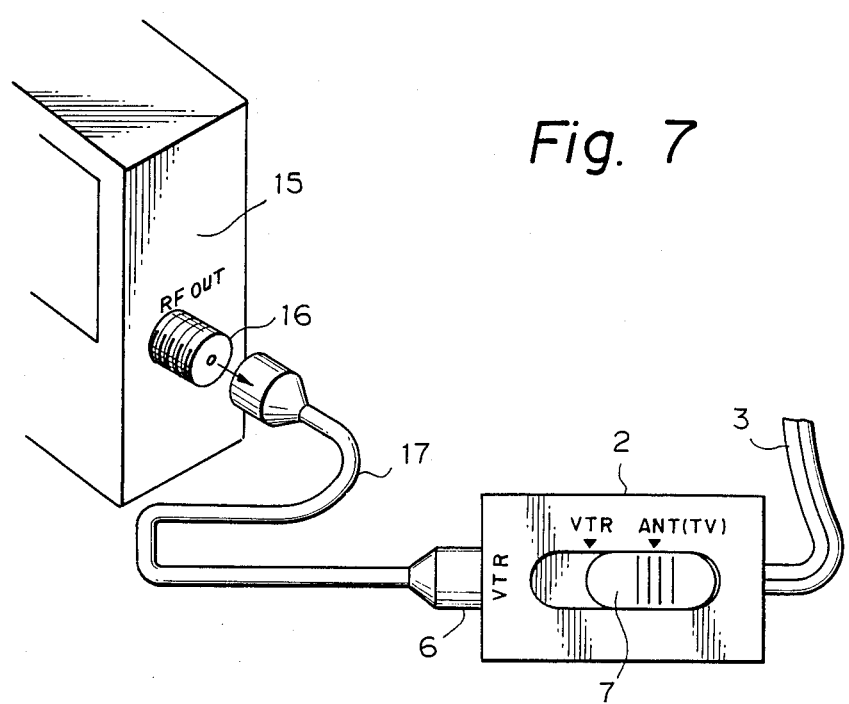
Figure 8:
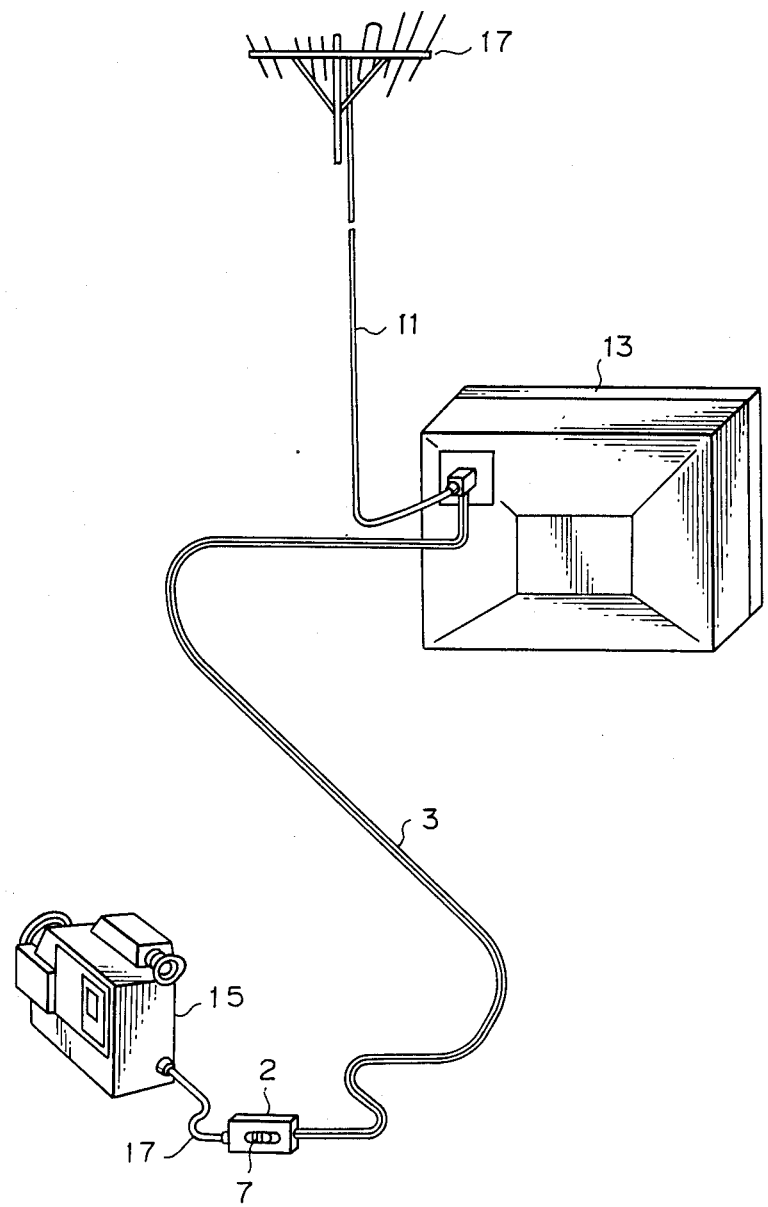

As shown in FIGS. 6 and 7, a television receiver 13 and a camera integrated type VTR 15 are respectively connected using an embodiment of the invention. That is, as illustrated in FIG. 6, a connector 12 of a cable 11 which is led out from a television antenna is connected to the input terminal 4 of the connector section 1. The output terminal 5 of the connector section 1 is connected to an antenna input terminal 14 of the television receiver 13. On the other hand, as shown in FIG. 7, the input terminal 6 of the connector section 2 is connected to an output terminal 16 of the camera integrated type VTR 15 through a cable 17. FIG. 8 shows a state after completion of the connection.

The plug type connector is used as the antenna input terminal of the television receiver of the NTSC system on the basis of its standard, while the jack type connector is used as the connector of the cable led out from the television antenna. Therefore, the plug type connector is used as the input terminal 4 of the connector section 1 and the jack type connector is used as the output terminal 5. As mentioned above, since the different connectors of the plug and jack types are used as the input terminal 4 and output terminal 5 which are arranged for the connector section 1, misconnection hardly occurs.

As mentioned above, in this embodiment, either the signal which is input to the input terminal 4 of the connector section 1 or the signal which is input to the input terminal 6 of the connector section 2 is selectively output from the output terminal 5 of the connector section 1 by the switching operation of the switch 7. Thus, either the output of the television broadcasting program received by the television antenna or the output of the VTR 15 can be selectively supplied to the television receiver 13 by the operation of the switch 7. Namely, when the switch 7 is switched so as to connect the terminals 7A and 7C, the signal received by the television antenna is supplied to the antenna input terminal 14 of the television receiver 13. When the switch 7 is switched so as to connect the terminals 7B and 7C, the output of the VTR 15 is supplied to the antenna input terminal 14 of the television receiver 13.

FIG. 8 shows the state in which the television receiver 13, VTR 15, and television antenna 47 are connected by using this embodiment. As shown in FIG. 8, the connector section 1 is arranged near the television receiver 13. The connector section 2 is arranged near the VTR 15. Therefore, the television receiver 13 and camera integrated type VTR 15 can be connected by only the cable 3 as the parallel line or cross lines consisting of the cables 3A and 3B, so that a plurality of cables do not complicatedly cross. Since the cable 11 from the television antenna 47 is connected to the input terminal 4 of the connector section 1 near the television receiver 13, the length of the cable 11 does not need to be extended.

Figure 9:
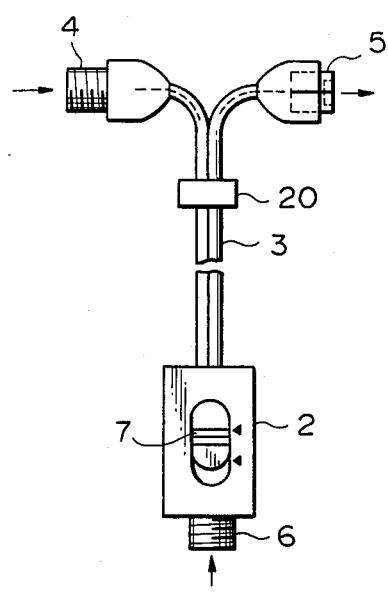
FIG. 9 is a plan view showing another embodiment of the invention.

In the embodiment explained above, the input terminal 4 and output terminal 5 have been integrated in the connector section 1. However, as shown in FIG. 9, it is also possible to constitute in a manner such that the input terminal 4 and output terminal 5 are separately provided and fixed by a ring 20.

Figure 10:
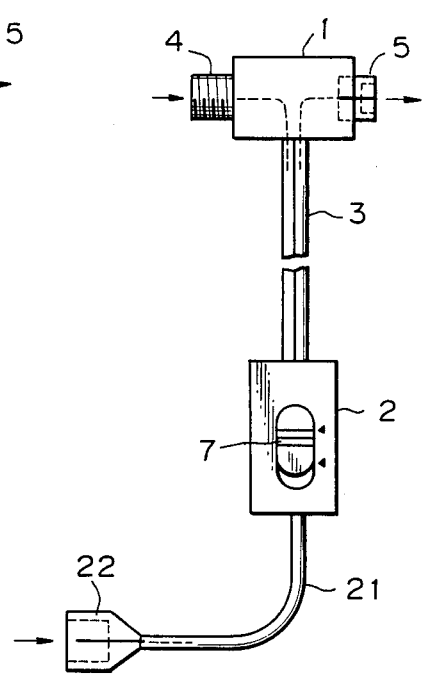
FIG. 10 is a plan view showing further another embodiment of the invention.

Further, in place of providing the input terminal 6 to the connector section 1, as shown in FIG. 10, it is also possible to constitute such that a cable 21 is led out and a connector 22 to be connected with an RF output terminal of a camera integrated type VTR is attached to the cable 21. With this structure, when the camera integrated type VTR 15 is connected, the cable 17 becomes unnecessary.

Figure 11:
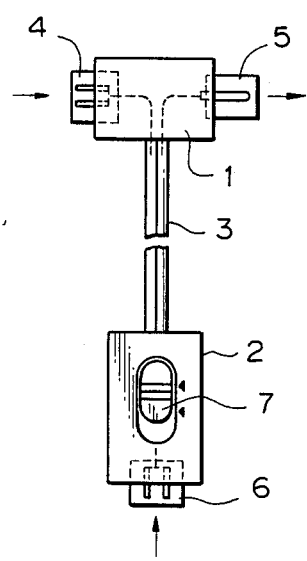
FIG. 11 is a plan view showing an embodiment in the case of the PAL system.

On the other hand, the present invention can be also similarly applied to the case of the PAL system. However, in this case, as shown in FIG. 11, the jack type connector is used as the input terminal 4 of the connector section 1, the plug type connector is used as the output terminal 5, and the jack type connector is used as the input terminal 6 of the connector section 2.

According to the invention, the connector section 1 is arranged near the television receiver 13, the connector section 2 is arranged near the camera integrated type VTR 15, and the connector sections 1 and 2 are connected by the cable 3 as the parallel line. Consequently, a plurality of cables do not complicatedly cross. On the other hand, since the cable 11 from the television antenna is connected to the input terminal 4 of the connector section 1 near the television receiver 13, there is no need to extend the cable 11. Further, since the different kinds of connectors of the plug and jack types are used as the input terminal 4 and output terminal 5 of the connector section 1, misconnection hardly occurs.

The present invention is not limited to the foregoing embodiments but many modifications and variations are possible within the spirit and scope of the appended claims of the invention.

What is claimed is:

1. A cable adapter having first and second connector sections which are remotely separated from each other, and at least one cable for connecting said first and second connector sections, said adaptor comprising:
    (a) a first input terminal adapted to be connected to an antenna terminal;
    (b) a second input terminal adapted to be connected to an output terminal of an apparatus for modulating video signals into radio frequency signals;
    (c) an output terminal adapted to be connected to an antenna input terminal of a television receiver; and
    (d) switching means for selecting input signals from one of said first and second input terminals;

wherein:
    said first input terminal and said output terminal are closely positioned and integrated in said first connector section,
    said second input terminal and said switching means are closely positioned and integrated in said second connector section,
    said first input terminal and one input terminal of said switching means are connected by a first cable line,
    said output terminal of said first connector section and an output terminal of said switching means are connected by a second cable line,
    said second input terminal is connected to another input terminal of said switching means,
    said first and second cable lines are arranged in parallel fashion, and said switching means function so as to selectively connect said first input terminal and said output terminal of said first connector section in a first switching position and to connect said second input terminal and said output terminal of said first connector section in a second switching position.

* * * * *